United States Patent [19]
Nagasawa

[11] Patent Number: 6,094,682
[45] Date of Patent: Jul. 25, 2000

[54] METHOD OF CONSTRUCTING THE PATH INFORMATION OF A NETWORK MANAGEMENT SYSTEM

[75] Inventor: Hidemasa Nagasawa, Kawasaki, Japan

[73] Assignee: Fujitsu Limited, Kanagawa, Japan

[21] Appl. No.: 09/119,192

[22] Filed: Jul. 20, 1998

[30] Foreign Application Priority Data

Mar. 13, 1998 [JP] Japan ................................. 10-062428

[51] Int. Cl.[7] .......................... G06F 15/173; G06F 15/16
[52] U.S. Cl. ......................... 709/224; 709/201; 709/223; 709/238; 709/242; 709/245; 370/392; 370/397; 370/400
[58] Field of Search .................................... 709/200–201, 709/223–224, 227–228, 238–239, 242, 245–246; 370/236–237, 392, 397, 400–401, 474

[56] References Cited

U.S. PATENT DOCUMENTS

| | | | |
|---|---|---|---|
| 5,394,393 | 2/1995 | Brisson et al. ........................ | 370/392 |
| 5,461,611 | 10/1995 | Drake, Jr. et al. ...................... | 370/420 |
| 5,586,254 | 12/1996 | Kondo et al. .......................... | 709/223 |
| 5,623,605 | 4/1997 | Keshav et al. ......................... | 709/236 |
| 5,675,741 | 10/1997 | Aggarwal et al. ..................... | 709/242 |
| 5,701,484 | 12/1997 | Aatsy .................................... | 709/238 |
| 5,778,184 | 7/1998 | Brownmiller et al. ................. | 709/224 |
| 5,818,842 | 10/1998 | Burwell et al. ........................ | 370/397 |
| 5,913,036 | 6/1999 | Brownmiller et al. ................. | 709/224 |
| 5,942,989 | 8/1999 | Nagasawa et al. .................... | 340/826 |
| 5,968,124 | 10/1999 | Takahashi et al. ..................... | 709/224 |

FOREIGN PATENT DOCUMENTS

| | | | |
|---|---|---|---|
| 3201837 | 9/1991 | Japan ............................... | H04J 3/06 |
| 5300172 | 11/1993 | Japan ............................. | H04L 12/48 |
| 974395 | 3/1997 | Japan ............................. | H04J 3/100 |

Primary Examiner—Zarni Maung
Assistant Examiner—Bharat Barot
Attorney, Agent, or Firm—Helfgott & Karas, PC.

[57] ABSTRACT

A network management system performs management by constructing path information which specifies a path existing in the network. An originating network element transmits a path-trace transmission value to the next network element in the network, the path-trace transmission value having (1) an identifier of the originating network element, (2) an identifier of an originating facility, and (3) an identifier of a network element which transmits the path-trace transmission value. The network element changes the identifier in (3) above to its own identifier and transmits the path-trace transmission value to the next network element. Succeeding network elements similarly transmit a path-trace transmission value up to a network element at an end point. Each network element holds cross-connect information for specifying an incoming-side facility and an outgoing-side facility of the network element and the path-trace transmission value that has been received, and transmits them to the network management system. The network management system constructs path information using the cross-connect information and the path-trace transmission value contained in path-information constructing data that has been collected.

7 Claims, 19 Drawing Sheets

Originate NE ID : ID OF NE AT PATH STARTING POINT (20 CHARACTERS MAX)
Originate Facility ID : ID OF FACILITY AT PATH STARTING POINT (10 CHARACTERS MAX)
Source NE ID : ID OF NE THAT TRANSMITTED THIS TRANSMISSION VALUE (20 CHARACTERS MAX)

FIG.5A

IN CASE OF NODE A (ORIGINATING NE):

| NE ID | From Facility ID | To Facility ID | Originate NE ID | Originate Facility ID | Source NE ID |
|---|---|---|---|---|---|
| Node A | 4-1 | 2-1 | null | null | null |

XCI: From Facility ID, To Facility ID
PTV: Originate NE ID, Originate Facility ID, Source NE ID

FIG.5B

IN CASE OF NODE B/C/D:

| NE ID | From Facility ID | To Facility ID | Originate NE ID | Originate Facility ID | Source NE ID |
|---|---|---|---|---|---|
| Node C | 1-1 | 2-1 | Node A | 4-1 | Node B |
| Node D | 1-1 | 4-1 | Node A | 4-1 | Node C |
| Node B | 1-1 | 2-1 | Node A | 4-1 | Node A |

XCI: From Facility ID, To Facility ID
PTV: Originate NE ID, Originate Facility ID, Source NE ID

FIG.6A

GROUP OF PATH-INFORMATION CONSTRUCTING DATA FOR SAME PATH

| NE ID | From Facility ID | To Facility ID | Originate NE ID | Originate Facility ID | Source NE ID |
|---|---|---|---|---|---|
| Node C | 1-1 | 2-1 | Node A | 4-1 | Node B |
| Node D | 1-1 | 4-1 | Node A | 4-1 | Node C |
| Node B | 1-1 | 2-1 | Node A | 4-1 | Node A |
| Node A | 4-1 | 1-1 | — | — | — |

FIG.6B

PATH INFORMATION

| DATA No. | NE ID | From Facility ID | To Facility ID | Originate NE ID | Originate Facility ID | Source NE ID |
|---|---|---|---|---|---|---|
| #1 | Node A | 4-1 | 1-1 | — | — | — |
| #2 | Node B | 1-1 | 2-1 | Node A | 4-1 | Node A |
| #3 | Node C | 1-1 | 2-1 | Node A | 4-1 | Node B |
| #4 | Node D | 1-1 | 4-1 | Node A | 4-1 | Node C |

METHOD OF CONSTRUCTING THE PATH INFORMATION OF A NETWORK MANAGEMENT SYSTEM

BACKGROUND OF THE INVENTION

This invention relates to a method of constructing the path information of a network management system (NMS). More particularly, the invention relates to a method of constructing the path information of a network management system by collecting data held by network elements (NE) such as transmitters constructing the network, using this data to construct path information which specifies a path that exists in the network, and managing the network.

(a) Shelf

An optical transmission system is constructed by preparing several basic shelves, combining the basic shelves to construct a network element such as a terminal station, repeater station or signal regenerator, and using such network elements to construct the optical transmission system. FIG. 14 is a diagram showing the construction of a high-speed shelf 150, and FIG. 15 is a diagram showing the construction of a tributary shelf 160. The high-speed shelf 150 includes line optical interfaces 151, 152 for interfacing optical transmission lines such as OC-48 (2.4 Ghz) optical transmission lines; a switch 153 for switching paths; and an interface 154 for interfacing the tributary side. The line optical interfaces respectively include O/E converters 151a, 152a for converting optical signals to electric signals; E/O converters 151b, 152b for converting electric signals to optical signals; demultiplexers (DMUX) 151c, 152c for demultiplexing a higher-order signal (an OC-48 optical signal) into three types of signals STS-1, STS-3C and STS-12C; and multiplexers (MUX) 151d, 152d for multiplexing the signals STS-1, STS-3C and STS-12C. The three types of signals demultiplexed by the demultiplexers 151c, 152c are allowed to pass by the switch 153 or are dropped on the tributary side by the switch 153. Further, the switch 153 switches signals STS-1, STS-3C, STS-12C, which have been inserted from the tributary side, in an E (East) or W (West) direction.

The tributary shelf 160 includes tributary-side interfaces 161, 162 for lower-order signals (DS3×12 ch, STS-1×12, OC-3/3C×2 ch, OC-12/12C×1 ch); a switch 163; and an interface 164 for interfacing the HS shelf. The tributary-side interfaces 161, 162 respectively include multiplexer/demultiplexers (MUX/DMUX) 161a, 162a for multiplexing the signals STS-1, STS-3C, STS-12C and inputting them to the switch 163, and for demultiplexing signals, which have entered from the switch 163, and outputting the demultiplexed signals; and interfaces 161b, 162b for interfacing an office multiplexer.

(b) LTE, LNR ADM, REG

By combining the high-speed (HS) shelf 150 and tributary (TRIB) shelf 160, it is possible to construct LTE (Line Terminal Equipment) serving as the termination station of an optical transmission line, as shown in FIGS. 16A, 16B, or an LNR ADM (Linear Add/Drop Multiplexer) serving as a repeater (D/I: Drop/Insert), as shown in FIG. 16C. A signal regenerator (REG) can be constructed by having the switch in the HS shelf 150 pass the signals. It should be noted that only the line optical interfaces on one side of the HS shelves in the LTEs of FIGS. 16A, 16B are being used.

(c) Construction of Transmission System

A point-to-point optical transmission system can be constructed by using LTEs, constructed as set for above, as terminal stations (stations A, B) of an OC-48 optical transmission line in the manner shown in FIG. 17. A ring system can be constructed by connecting LNR ADMs in the form of a ring, as illustrated in FIG. 18. Furthermore, a linear ADM system can be constructed by using LTEs as terminal stations (stations A, C) and an LNR ADM as a repeater station (station B), as depicted in FIG. 19.

(d) Frame Format

Information in the above-described optical transmission system is transmitted upon being assembled into an SDH/SONET frame. FIG. 20A is a diagram useful in describing the format of a 155.52 Mbps frame in SDH. One frame consists of 9×270 bytes. The first 9×9 bytes are section overhead (SOH) and the remaining bytes are path overhead (POH) and payload (PL). The section overhead SOH transmits information (a frame synchronizing signal) representing the beginning of a frame, information specific to the transmission line (information for checking for error at the time of transmission, information for network maintenance, etc.) and a pointer which indicates the position of the path overhead POH. The path overhead POH transmits inter-network end-to-end monitoring information, and the payload PL transmits 150.52 Mbps information.

The section overhead SOH is composed of 3×9-byte repeater section overhead, a 1×9-byte pointer and 5×9-byte multiplexer overhead. As shown in FIG. 20B, the repeater section overhead has bytes A1–A2, C1, B1, E1, F1 and D1–D3. The multiplexer section overhead has bytes B2, K1–K2, D4–D12 and Z1–Z2. The D1–D3 bytes are used in data transmission between repeater sections, and the D4–D12 bytes are used in data communication between multiplexer sections. A 155.52×n Mbps frame can be constructed by multiplexing n-number of the frames shown in FIG. 20A. For example, a 622.08 Mbps frame can be constructed by multiplexing four of the frames shown in FIG. 20A.

(e) HS Shelf

FIG. 14 is a diagram showing the construction of the HS shelf, with the focus being on the main signal system. However, an HS shelf is equipped with various units in addition to the units of the main signal system, examples of these other units being an overhead processing unit, a processing unit for interfacing an external device, and a unit for performing monitoring/controlling within the shelf.

FIG. 21 is a diagram showing the construction of an HS shelf which includes these units.

As shown in FIG. 21, the HS shelf 150 possesses an optical transmitter unit 1 and an optical receiver unit 2 as OC-48 optical signal interface units. The optical transmitter unit 1 functions to convert an STS-48 electric signal to an OC-48 optical signal and transmit the latter signal, and the optical receiver unit 2 functions to convert an OS-48 optical signal to an STS-48 electric signal.

A multiplex/demultiplex/TSA function unit 3 is used in the multiplexing and demultiplexing of the STS-48 electric signal. If the HS shelf is used in an LTE device and LNR ADM device, the unit 3 functions to multiplex the STS-12C×4 electric signals from the shelf of the lower-order group to the STS-48 electric signal and, conversely, to demultiplex the STS-48 electric signal to the STS-12C×4 electric signals. The HS shelf has a STS-1×48 TSA (Time Slot Assignment) function as well implemented when multiplexing/demultiplexing is performed.

In addition to the above-mentioned units, the HS shelf has a power supply unit 4, an alarm function unit 5, an interface unit 6 having a function for interfacing an external monitoring system (e.g., a network management system NMS), a control unit 7 for supervising the internal shelf monitoring/control function, and an overhead processing unit 8 for processing the overhead byte OHB of the OC-48 signal. A terminal such as a personal computer is connected to the control unit 7.

In a large-capacity network composed of currently existing SDH/SONET transmitters/wireless units (network elements), a network management system (NMS) for centralized management of these network elements (NEs) is essential. An NMS functions to monitor faults and identify faulty points by acquiring NE device status and line status. In order to implement these functions, path (line) management is vital. Path management includes a function for collecting path information (the order in which NEs constructing a path are connected and cross-connect information within an NE) that has already been set, a path set-up function used when changing and adding on a path, a path-related alarm detection function and a path repair function.

Either of the following two techniques is used to acquire path information in the conventional system: (1) A path from the NMS is established with respect to each NE and the pass set-up information at this time is stored in a database. (2) The cross-connect set-up of each NE and the status of connection of each NE are traced in detail, path information is generated from this data and the information is stored in a database.

However, both of these techniques are manual techniques that require control by the operator. Moreover, a problem arises in terms of processing time. In particular, with technique (1), the fact that paths on the order of tens of thousands of lines must be established when a large-scale network is initially started up means that a great amount of time and labor is required to perform this operation. Technique (2), which extracts cross-connect information from an NE and constructs path information automatically, involves complicated processing and is impractical from the standpoint of processing time.

Further, recent network elements are equipped with a cross-connect function so that path set-up and path change (cross-connect set-up and cross-connect change) within an NE can be performed with ease using a terminal such as a personal computer. Though this capability is convenient, there are instances where an already established path is changed inadvertently to a path having a different arrangement. In such cases it is necessary to generate an alarm promptly and restore the original path set-up. With the prior art, however, the NMS is not adapted to effect restoration automatically upon detecting such an alarm. As a result, the original path set-up cannot be restored in prompt fashion.

SUMMARY OF THE INVENTION

Accordingly, an object of the present invention is to make possible the collection of path information by an NMS and to shorten the time needed for path information collection processing.

Another object of the present invention is to detect a change in a path promptly and restore the original path when a path has been changed accidentally.

It is necessary to perform on-site adjustment when a network is initially started-up. Specifically, on-site adjustment is performed by establishing a path in each NE by means of a terminal such as a personal computer. Consequently, when power is introduced to an NE to render the NE operable (to initially start-up the NE) after on-side adjustment has been carried out, a path will already have been established and the NMS need not establish a path for each NE but need only acquire path information from each NE. In order to acquire the path information in a short time and execute processing in simple fashion, the present invention sets data, which is for constructing path information, in each NE in advance, collects this data to construct path information and sets the information in a database.

More specifically, according to the present invention, an originating NE, namely an NE that is the starting point of a path, takes the opportunity of a change in state from an out-of-service (OOS) state to an in-service state to transmit a path-trace transmission value having the following identifiers to an immediately adjacent NE downstream:

(1) an identifier of the originating NE;

(2) an identifier of an originating facility; and (3) an identifier of the NE that transmits this transmission value.

The adjacent NE, which has received this path-trace transmission value, changes the identifier in (3) above to its own identifier and then transmits the resulting path-trace transmission value to the next immediately adjacent NE, this operation being performed from this point onward in similar fashion to transmit the path-trace transmission value up to an NE at an end point. Each NE holds cross-connect information for specifying an incoming-side facility and an outgoing-side facility of the NE and the received path-trace transmission value as path-information constructing data, and transmits the path-information constructing data in response to a request from an NMS. The NMS performs management by creating and storing path information using the cross-connect information and path-trace transmission value contained in path-information constructing data that has been acquired. By thus including a path-trace transmission value in path-information constructing data, path information can be constructed simply and in a short period of time.

Further, the NMS constructs path information by gathering, from the acquired path information, path-information constructing data for which the identifiers of the originating NEs in (1) are identical and, moreover, for which the identifiers of the originating facilities in (2) above are identical. This arrangement makes it possible to construct path information by selecting, in simple fashion, path-information constructing data of NEs that construct the path.

Further, the NMS adopts an NE, which holds path-information constructing data having the identifier of the originating NE as the NE identifier mentioned in (3) above, as a first NE connected to the originating NE, adopts an NE, which holds path-information constructing data having the identifier of the first NE as the NE identifier mentioned in (3) above, as a second NE connected to the first NE, thenceforth performs a similar operation to obtain NEs along the route of a path, and constructs path information by arraying the path-information constructing data in the order of the NEs along the route of the path. This makes it possible to construct path information by arraying, in simple fashion, the path-information constructing data in the order in which the NEs constructing the path are connected.

The originating NE and each other NE periodically transmit the path-trace transmission value in the direction of a destination NE. In a case where each other NE receives a transmitted value that differs from an expected value, or in a case where a transmitted value cannot be received even upon elapse of a predetermined time, it is judged that a path (cross-connect of a prescribed NE) has been changed erroneously owing to erroneous operation of a local maintenance terminal or the like, an alarm (Path Trace ID Mismatch Alarm/Unequipped Alarm, etc.) is transmitted to the NMS, the NMS responds to reception of the alarm by searching for the NE whose cross-connect has been changed and subjects this NE automatically to processing to restore the original path. By thus sending path-trace transmission values periodically, it is possible to detect and deal with a change in path promptly.

Further, the originating NE and each other NE periodically transmit the path-trace transmission value in the direction of a destination NE. In a case where an alarm from all NEs with the exception of the originating NE of a path have been detected, the NMS checks to determine whether the path-trace transmission value of the originating NE agrees with the path-trace transmission value prevailing thus far. If the two agree, it is judged that the cross-connect of the originating NE has been changed erroneously owing to erroneous operation of a local maintenance terminal or the like, and the originating NE is subjected automatically to processing to restore the original path. If the two do not agree, this indicates that path-trace transmission value of the originating NE has merely been rewritten and it does not indicate a path change (a change in cross-connect). From this time onward, therefore, the changed path-trace transmission value is regarded as being the effective value and the alarm is ignored. Thus sending path-trace transmission values periodically makes it possible to promptly detect and deal with a path change and with a change in path-trace transmission value at a originating NE.

Other features and advantages of the present invention will be apparent from the following description taken in conjunction with the accompanying drawings.

BRIEF DESCRIPTION OF THE DRAWINGS

FIGS. 5A, 5B are diagrams useful in describing path-information constructing data;

FIGS. 6A, 6B are diagrams useful in describing construction of path information;

DESCRIPTION OF THE PREFERRED EMBODIMENTS (a) Network Configuration

Figure 1:
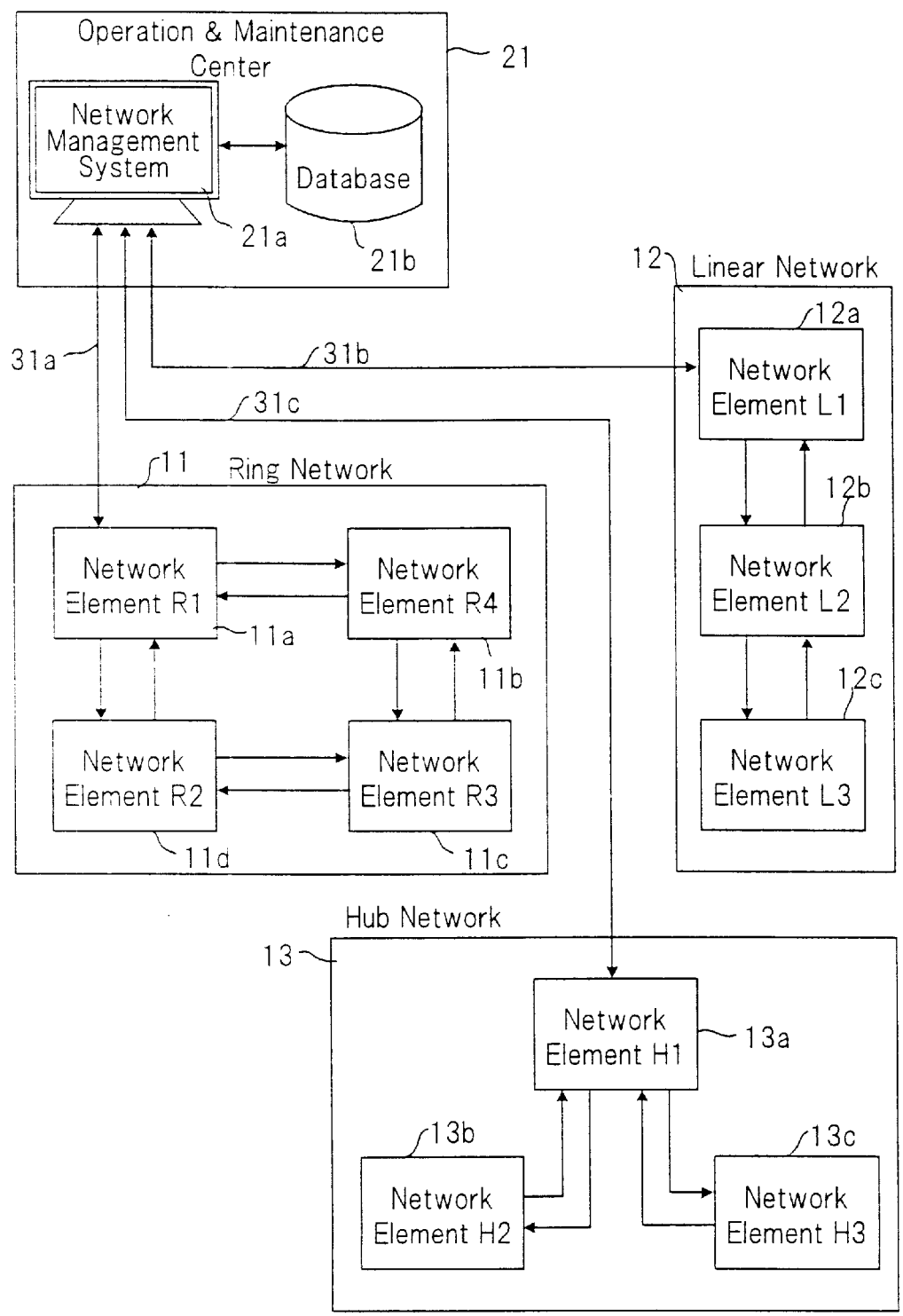
FIG. 1 is a diagram showing the configuration of a network.

FIG. 1 is a diagram illustrating the configuration of a network to which the present invention can be applied. Shown in FIG. 1 are a ring network 11, namely a network having a ring-shaped configuration, a linear network 12, namely a network having a linear configuration, a hub network 13, namely a network having a hub-like configuration, and an operation & maintenance center 21, which includes a computerized network management system (NMS) 21a for fault monitoring and path information processing, and a database 21b for storing various information such as fault monitoring information and path information.

The ring network 11, linear network 12 and hub network 13 have e.g. SDH/SONET transmitter/wireless units, namely network elements (NEs), 11a–11d, 12a–12c, 13a–13c connected in ring-shaped, linear and hub-shaped configurations, respectively.

Figure 21:
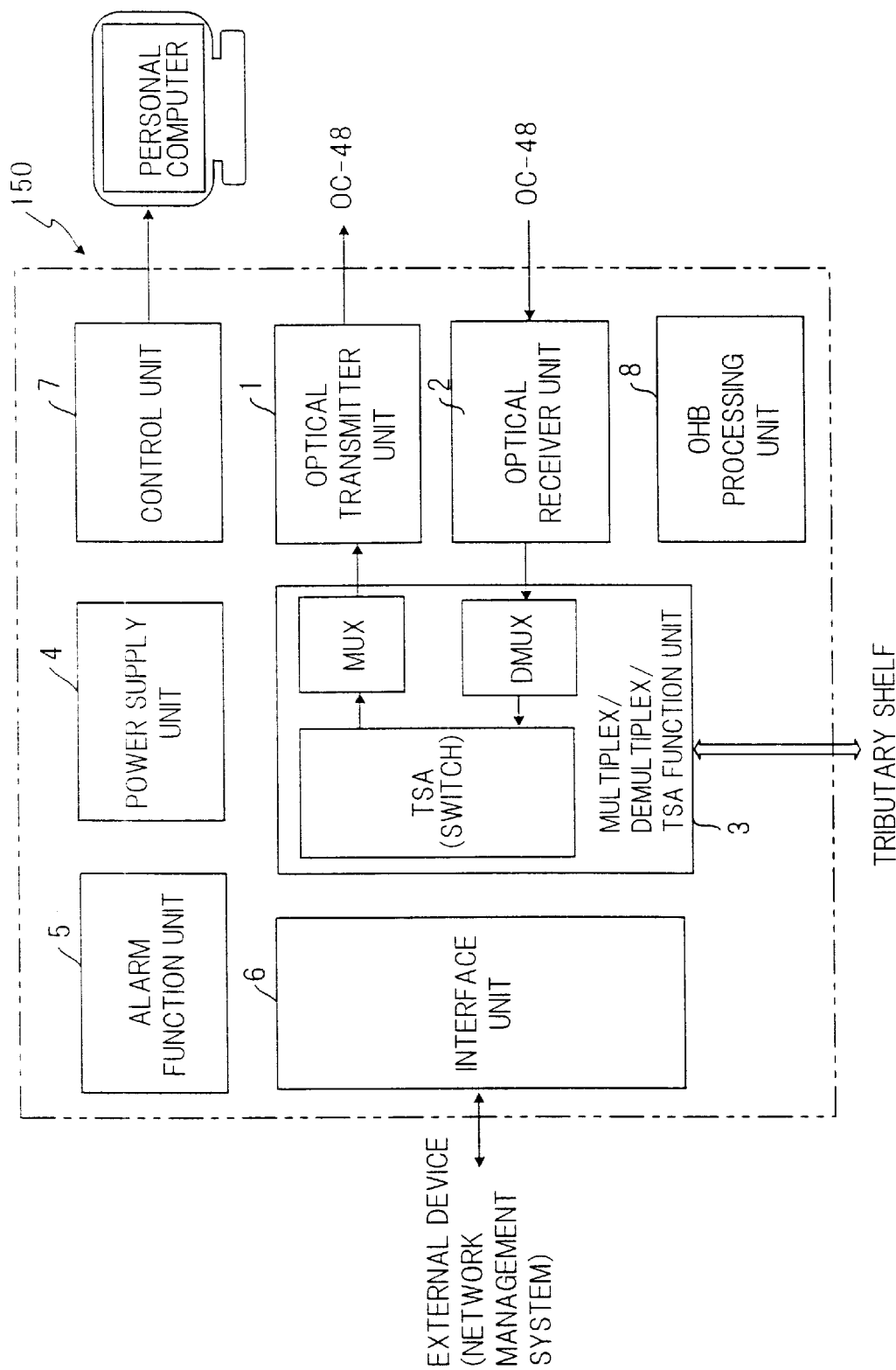
FIG. 21 is a diagram showing another construction of a high-speed shelf.

In each of the networks 11–13, the NEs 11a–11d, 12a–12c, 13a–13c have the construction shown in FIG. 21 and are interconnected by STM-n (n=1, 4, 16, 64) or by OC-n (n=1, 3, 12, 48, 192) of an equivalent level so that data can be transmitted and mutual communication achieved. The NEs 11a, 12a, 13a of the respective networks 11, 12, 13 are connected to the NMS 21a as gateway NEs via communication links 31a, 31b, 31c, respectively, such as LANs, whereby these NEs can communicate with the NMS 21a.

Accordingly, the NMS 21a can communicate with the gateway NEs via an X.25 network or LAN and with other NEs via the gateway NEs in accordance with the SDH/SONET interfaces. In other words, the NMS is capable of communicating with all of the NEs.

(b) Path Description

Figure 2:
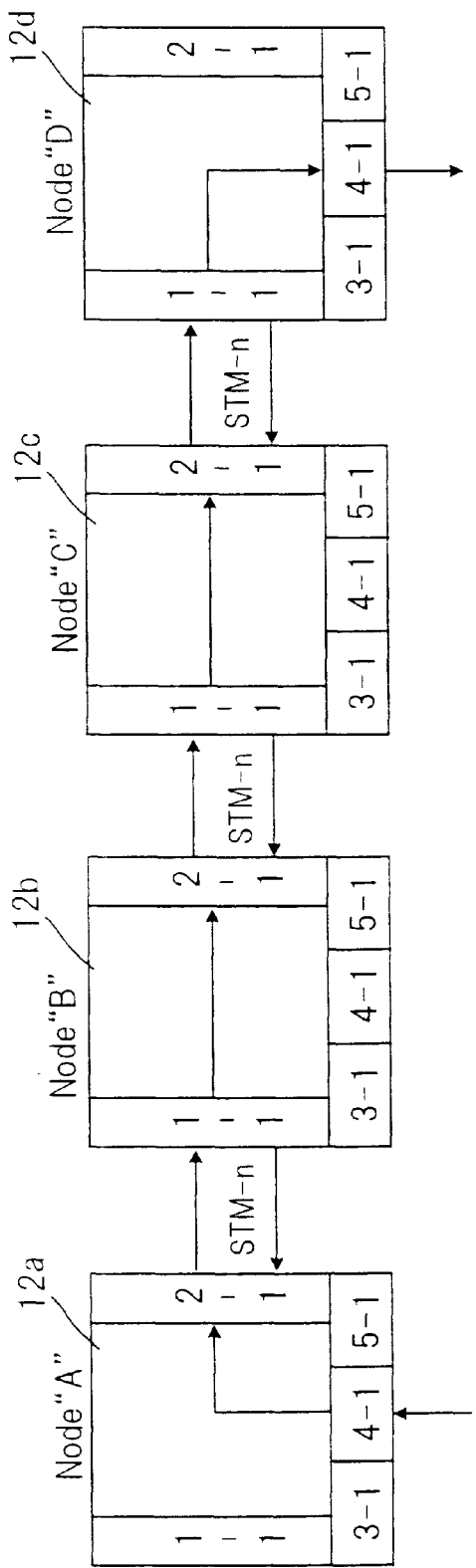
FIG. 2 is a diagram useful in describing a path in a network having a linear construction.
Figure 14:
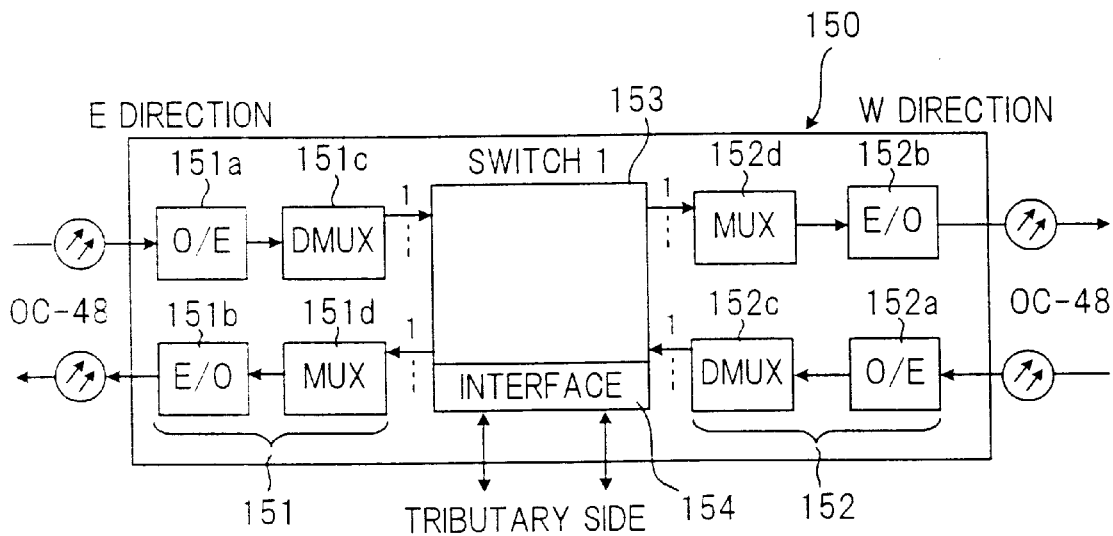
FIG. 14 is a diagram showing the construction of a high-speed shelf.
Figure 15:
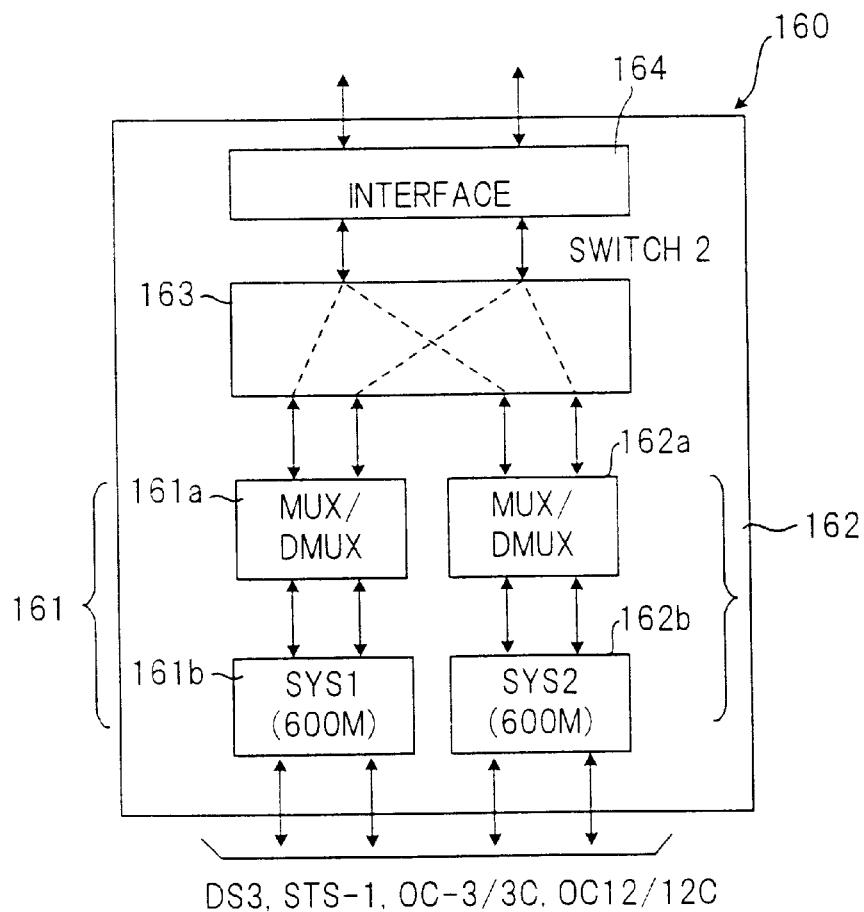
FIG. 15 is a diagram showing the construction of a tributary shelf.
Figure 16A:
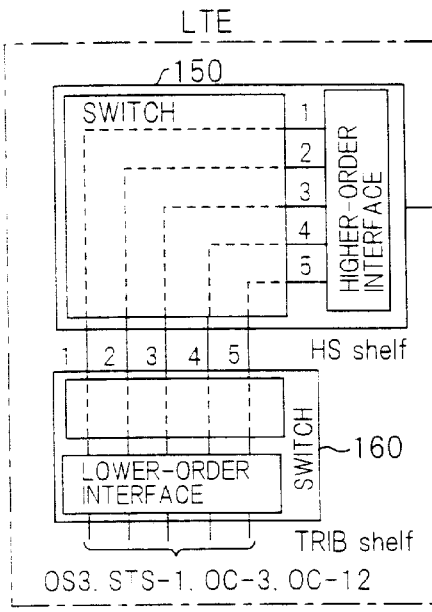
FIGS. 16A, 16B and 16C are diagrams showing the constructions of line terminal equipment and a linear add/drop multiplexer.
Figure 16B:
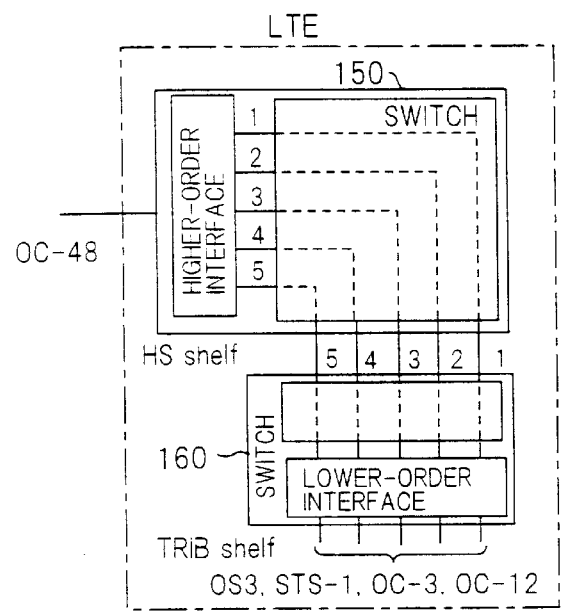
Figure 16C:
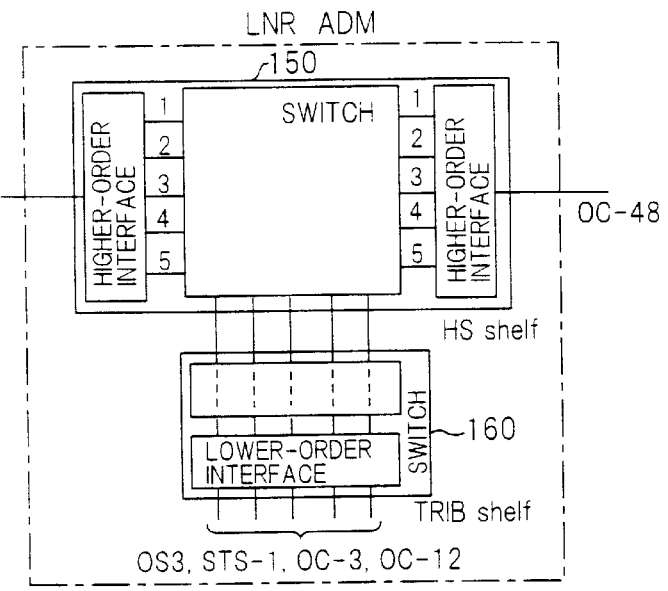
Figure 17:
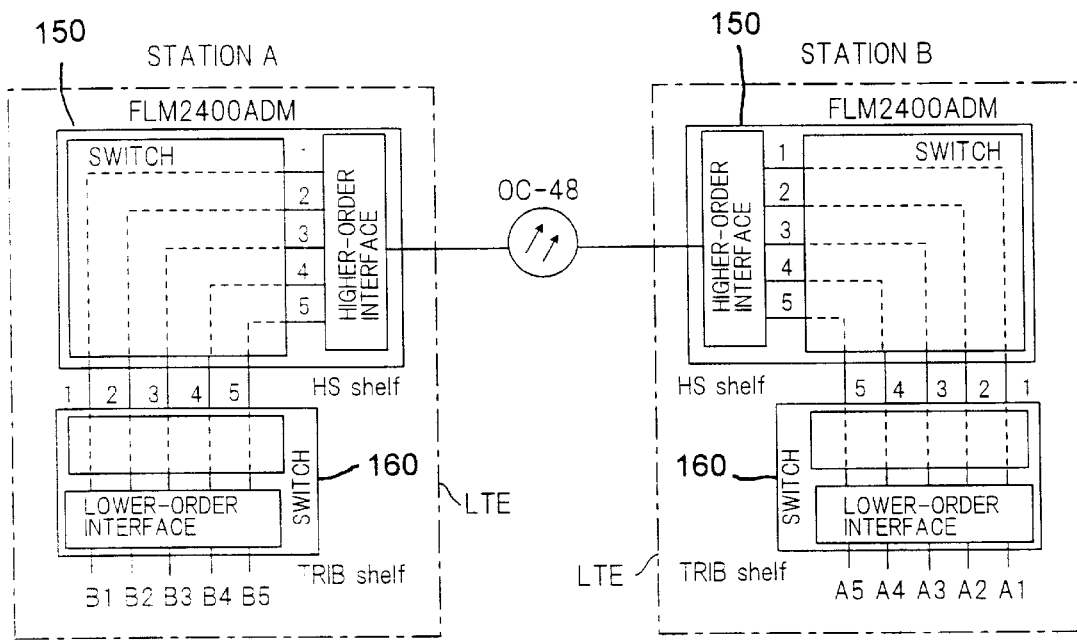
FIG. 17 is a diagram showing the configuration of a point-to-point system.
Figure 18:
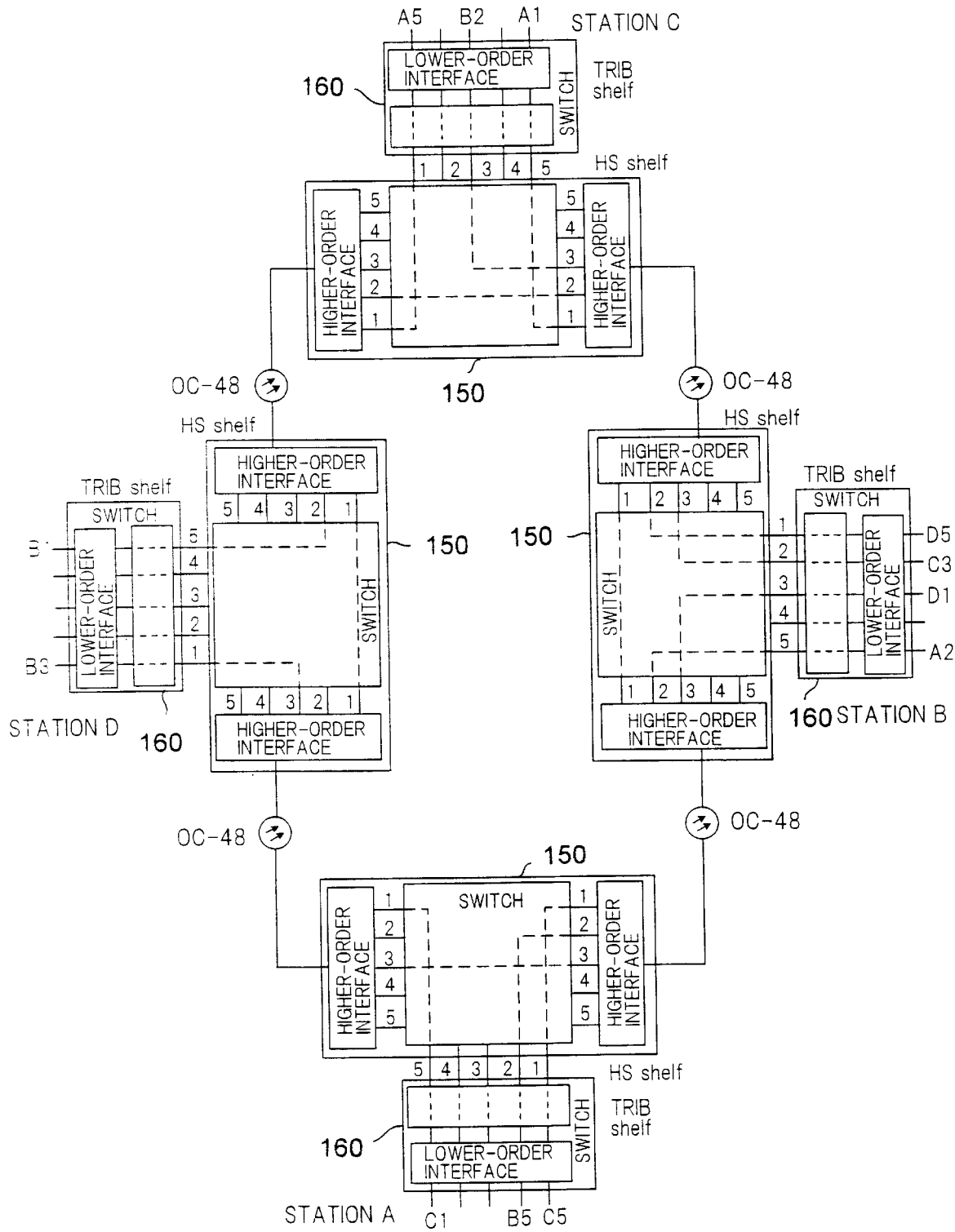
FIG. 18 is a diagram showing the configuration of a ring system.
Figure 19:
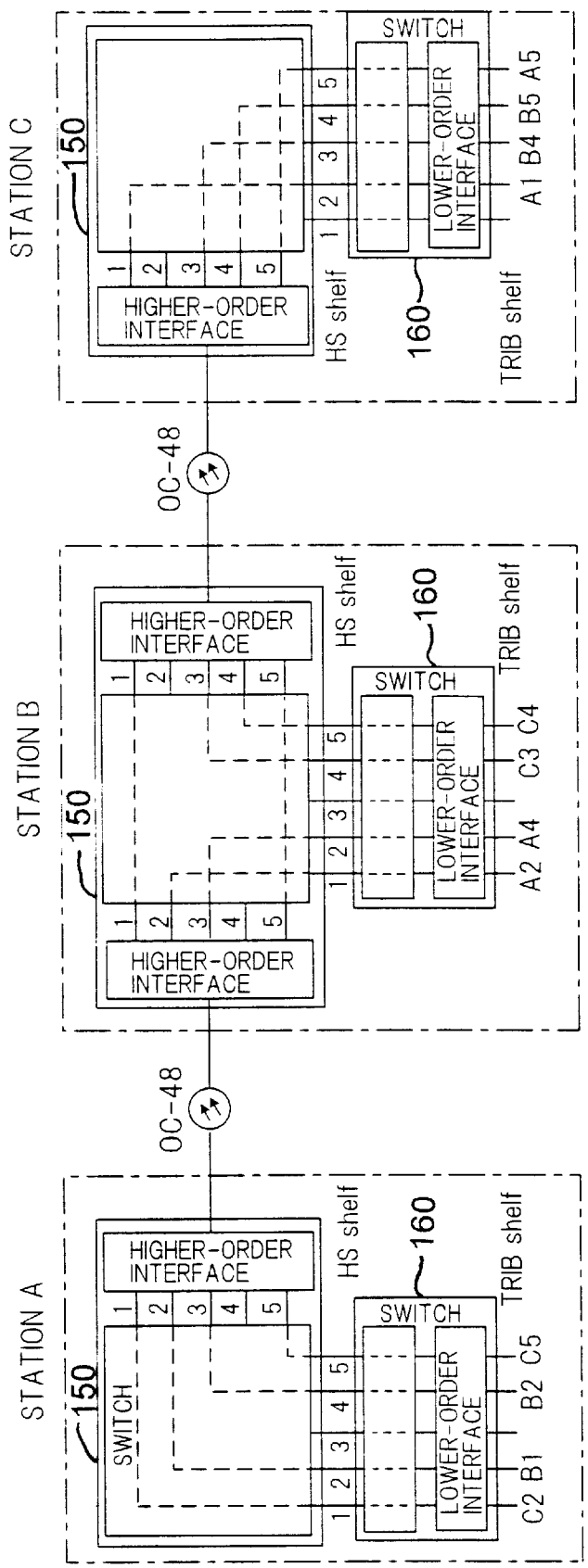
FIG. 19 is a diagram showing the configuration of a linear ADM system.
Figure 20A:
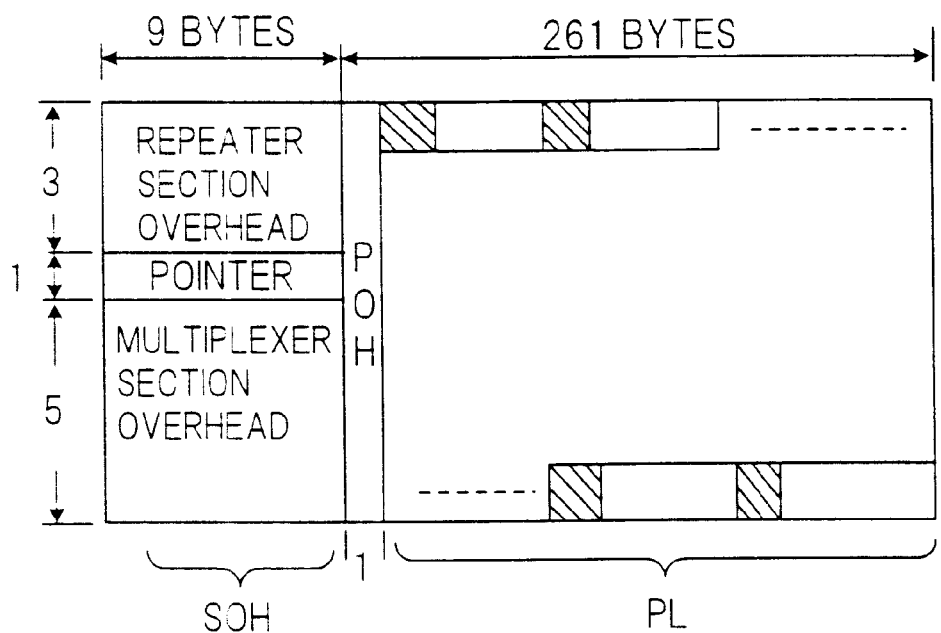
FIGS. 20A, 20B are diagrams useful in describing an SDH frame format.
Figure 20B:
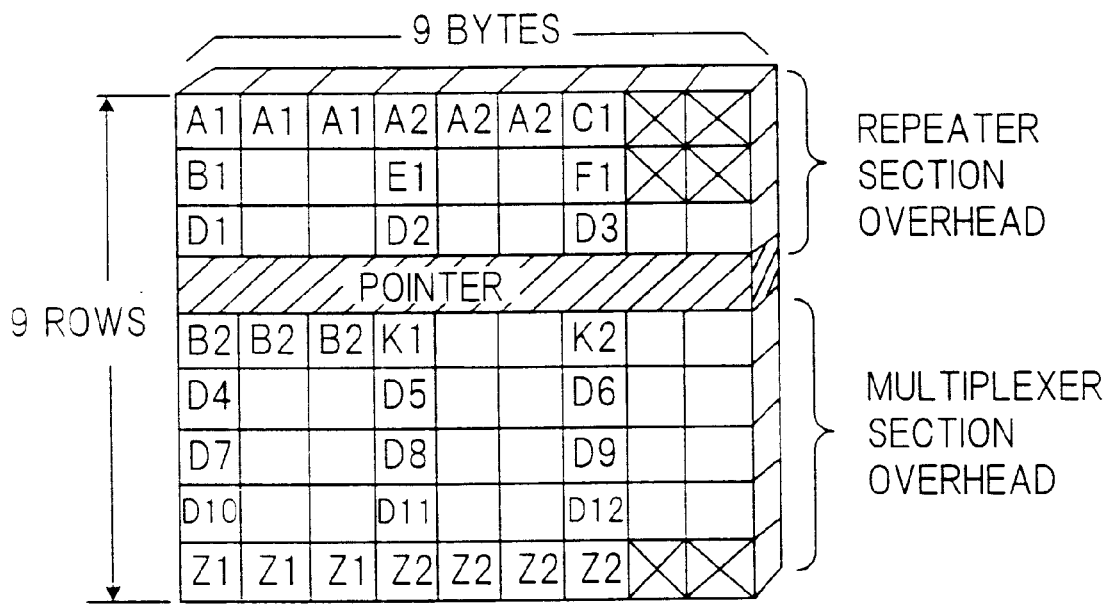

FIG. 2 is a diagram for describing a path in a linear network. The network elements (nodes A through D) 12a–12d are linearly connected. The nodes A–D each have the construction shown in FIGS. 14, 21 but are shown here in simplified form in order to simplify the description. High-speed interfaces (referred to also as "aggregate interfaces") 1-1 and 2-1 are for interfacing the side of the optical transmission line. Tributary interfaces 3-1 through 5-1 are for interfacing the tributary side. The facility IDs are indicated by 1-1 through 5-1. A facility signifies a channel or line.

A path has been established from node A to node D. The node A is the starting-point NE (originating NE) of the path, and the facility (ID=4-1) on the tributary side of the node A is the starting-point facility (originating facility). At the originating node A, a cross-connect has been established from the originating facility (ID=4) to the facility (ID=2-1) on the aggregate side. The nodes B and C are path traversal NEs, and cross-connects have been established from the facility (ID=1-1) on one aggregate side to the facility (ID=2-1) on the other aggregate side. The node D is the destination NE of the path and a cross-connect has been established from the facility (ID=1-1) on one aggregate side to the facility (ID=2-1) on the other aggregate side.

(c) Sending/receiving Path-trace Transmission Value

Figure 3:
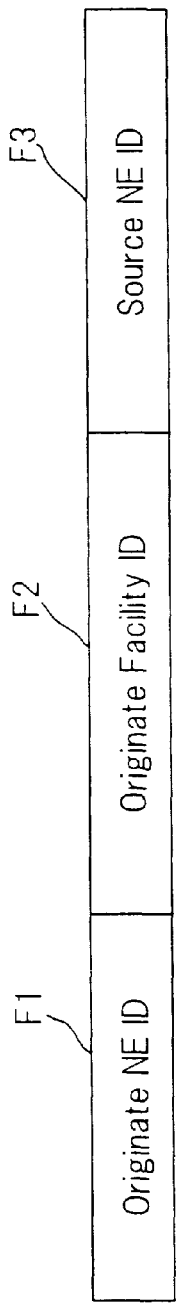
FIG. 3 is a diagram useful in describing the data format of a path-trace transmission value.
Figure 4:
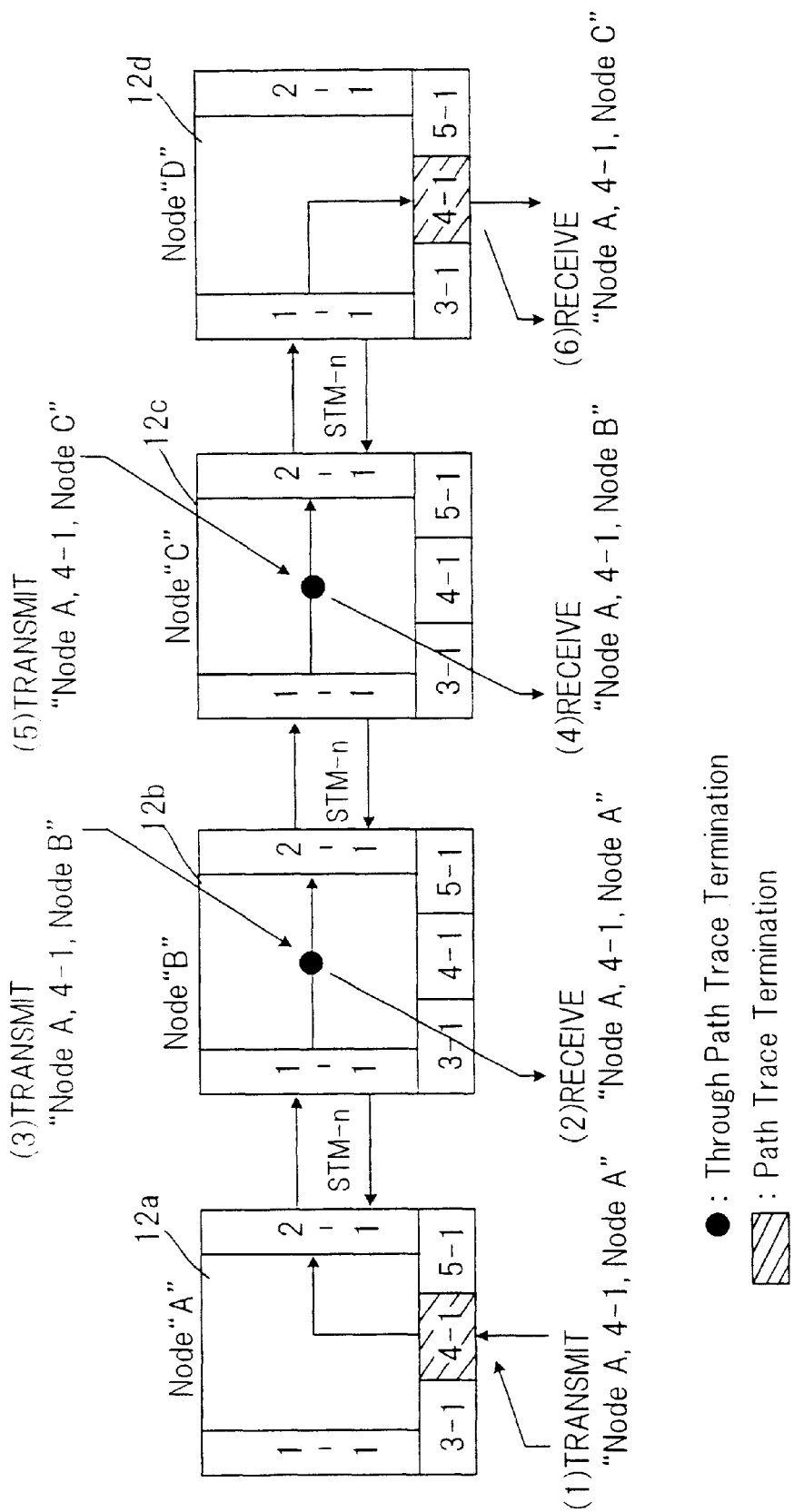
FIG. 4 is a diagram useful in describing a path-trace transmission value that is transmitted and received.

FIG. 3 is a diagram useful in describing the data format of a path-trace transmission value, and FIG. 4 is a diagram useful in describing a path-trace transmission value sent and received by the nodes A through D.

If the service status of the facility (ID=4-1) of node A, which is the originating NE, changes from the OOS (out of service) state to the in-service state under conditions in which the path (cross-connect) described in FIG. 2 has been established in each of the nodes A through D, traffic starts passing through the originating node A and the node begins transmitting a path-trace transmission value "Node A, 4-1, Node A", which was registered at the time of path establishment [see (1) in FIG. 4].

This path-trace transmission value has three fields F1, F2 and F3, as shown in FIG. 3, which respectively transmit the following items:

(1) the originating NE ID;
(2) the originating facility ID; and
(3) the source NE ID.

The originating NE ID of the first field is the identifier of the originating NE of the path, the originating facility ID of the second field is the identifier of the originating facility of the path, and the source NE ID of the third field is the identifier of the NE that transmits this path-trace transmission value. Accordingly, in the example of FIG. 2, the originating NE ID is node A, the originating facility ID is 4-1 and the originating node A transmits the above-mentioned path-trace transmission value.

The node B neighboring the originating node A receives the path-trace transmission value "Node A, 4-1, Node A" from the node A as the result of the through-path trace [(2) in FIG. 4]. The node B rewrites "Node A" of the third field F3 of the received path-trace transmission value to "Node B", which is its own node identifier, and then transmits the rewritten path-trace transmission value "Node A, 4-1, Node B" to the next node C [(3) in FIG. 4].

Upon receiving the path-trace transmission value "Node A, 4-1, Node B" sent from node B [(4) in FIG. 4], the node C rewrites "Node B" of the third field F3 to "Node C, which is its own node identifier, and then transmits the rewritten path-trace transmission value "Node A, 4-1, Node C" to the next node D [(5) in FIG. 4].

Finally, the facility (ID=4-1) on the tributary side of the node D detects the path-trace transmission value "Node A, 4-1, Node C". Since the node D is the destination NE of the path, this node terminates the path and does not execute processing for transmitting the path-trace transmission value any farther.

If each of the nodes A through D receives the path-trace transmission value from upstream in concurrence with the processing for sending and receiving the path-trace transmission value, the node stores its own cross-connect information and the received path-trace transmission value (the received value) in an internal memory as the path-information constructing data. FIGS. 5A, 5B show examples of path-information constructing data. FIG. 5A shows the path-information constructing data of node A, which is the originating NE, and FIG. 5B shows the path-information constructing data of the nodes B through D, which are NEs other than the originating NE, where XCI represents the cross-connect information and PTV indicates the path-trace transmission value. The cross-connect information XCI includes (1) the incoming-side facility ID of the local node and (2) the outgoing-side facility ID of the local node. The path-information constructing data PTV includes (1) the originating NE ID, (2) the originating facility ID and (3) the source NE ID. Since the node A constituting the originating NE does not receive a path-trace transmission value, the originating NE ID, originating facility ID and source NE ID constructing the path-trace transmission value PTV are null.

(d) Construction of Path Information.

After the path-information constructing data is stored in each NE (node), the network management system (NME) 21a logs onto each NE and requests the path-information constructing data. In response, each node (e.g., the nodes A–D in FIG. 2) sends the NMS 21a the path-information constructing data shown in FIGS. 5A, 5B. As a result, the NMS 21a collects, from each of the NEs, the path-information constructing data relating to all paths in the network. The NMS 21a subsequently classifies the collected path-information constructing data according to path and constructs path information by rearranging the data in the order of the NEs along the route of the path.

Classification Processing

The originating NE identifiers (originating NE IDs) contained in path-information constructing data acquired from each node (with the exception of the originating node) constructing the same path are identical. So are the originating facility identifiers (originating facility IDs). Accordingly, the NMS 21a gathers the path-information constructing data for which the originating NE identifiers are identical and, moreover, for which the originating facility identifiers are identical, as well as the path-information constructing data of the originating NE, and classifies this gathered data as data of the same path group. As a result, a group of path-information constructing data shown in FIG. 6A is obtained in regard to the path of FIG. 2.

Rearrangement Processing

When classification processing has been completed, the NMS 21a obtains, from the path-information constructing data of each group, path-information constructing data for which (1) the originating NE ID, (2) the originating facility ID and (3) the source NE ID are all null, and places this data at the beginning (Data #1) as the path-information constructing data of the originating NE (see FIG. 6B).

Next, the NMS 21a selects from the group the path-information constructing data having the "Source NE ID" that matches the NE identifier (NE ID=Node A) of the leading data Data #1, and places this data next to the leading data as second data (Data #2).

Next, the NMS 21a selects the path-information constructing data having the "Source NE ID" that matches the NE identifier (NE ID=Node B) of the second data Data #2, and places this data next to the second data as third data (Data #3).

By thenceforth repeating this rearrangement in similar fashion, all of the data is rearranged to obtain the arrangement shown in FIG. 6B. The order of items of path-information constructing data Data #1 through Data #4 in the resulting arrangement will indicate the route of the path. Accordingly, the NMS 21a stores the data arrangement of FIG. 6B in the database 21 as the path information.

A database for path management is constructed by applying the above-described processing to all groups. For various reasons, however, the NMS 21a repeatedly logs on to and logs off from the NEs of the network. If the processing for constructing the path information is executed when log-on is performed, an undesirable consequence is an increase in the load upon the NMS. For example, assume that an NE logs off because of a severed optical fiber or for some other reason and subsequently logs on again after repairs are made. In such case there is no change in the established path. If the processing for constructing path information is executed nevertheless, this places a needless load upon the NMS. Accordingly, the processing for constructing path information basically is executed only the first time the NMS logs onto an NE. If subsequent log-on to this NE is absolutely essential, a request is sent to the NMS manually to initiate the function.

Further, if it becomes necessary to add on a path after operation of the network has been started, the addition is performed by the path setting function of the NMS, which is supported conventionally, and the path information is added to the database at the same time.

Figure 7:
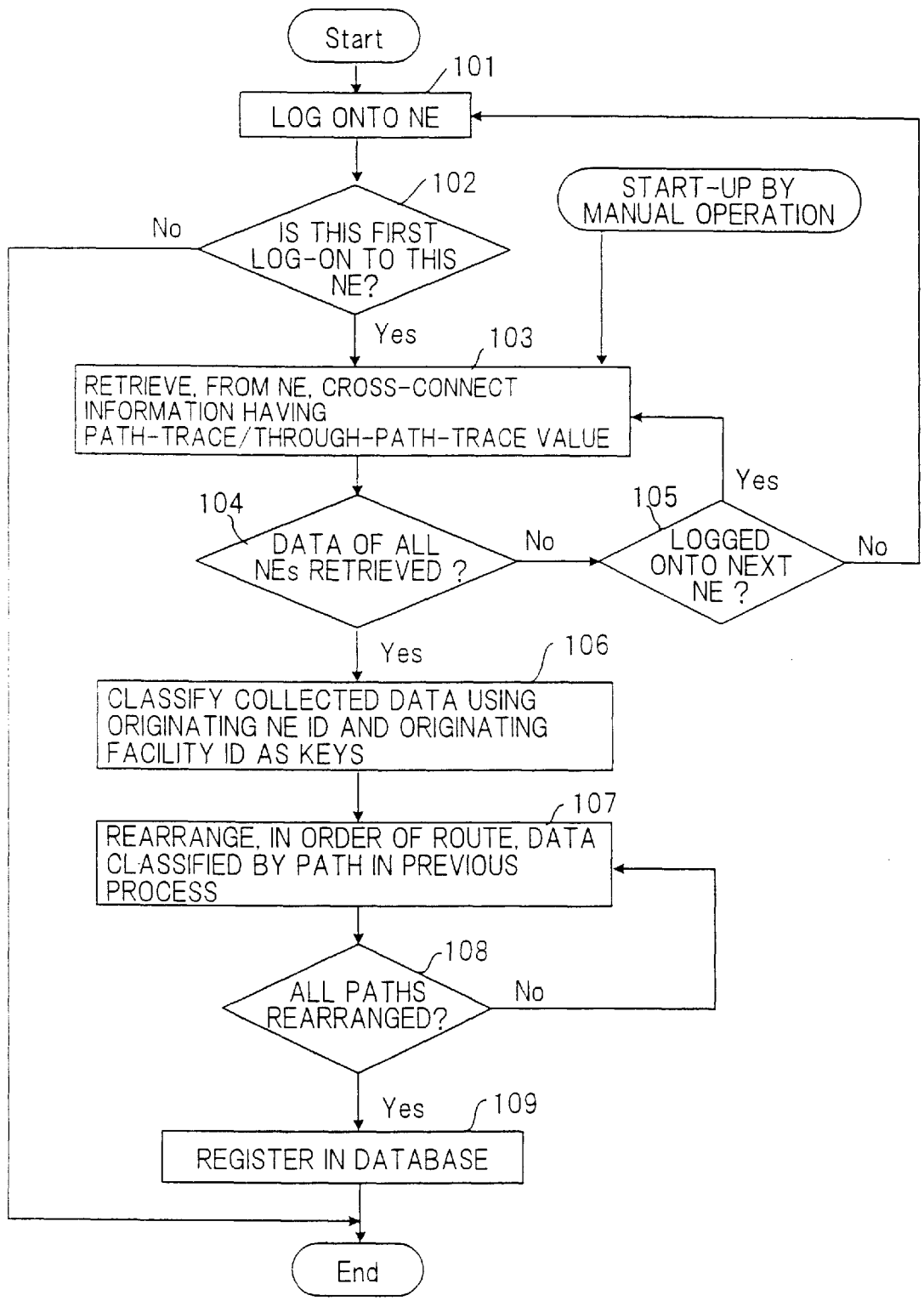
FIG. 7 is a flowchart of path information construction processing.

FIG. 7 is a flowchart of path information construction processing.

After path-information constructing data has been stored in each NE, the NME 21a logs onto a prescribed NE (step 101), whereupon it is determined whether this is the first time the log-on to this NE has been performed (step 102). If it is not the first time, then path construction processing in regard to this NE is terminated.

If this is the first log-on to the NE, however, then the NME 21a acquires the path-information constructing data from this NE (step 103) and then determines whether path-information constructing data has been acquired from all NEs (step 104). If the decision rendered is "NO", then the NME determines whether log-on to the next NE is being performed (step 105). If the answer is "NO", control returns to step 101, the NME logs onto the next NE and the ensuing processing is executed. If log-on to the next NE is confirmed at step 105, however, then the NME acquires the path-information constructing data from this NE by the processing of step 103. The above-described operation is repeated until path-information constructing data is collected from all NEs.

If path-information constructing data has been collected from all NEs, the NMS gathers path-information constructing data for which the originating NE identifiers (originating NE IDs) are identical and, moreover, for which the originating facility identifiers (originating facility IDs) are identical, as well as the path-information constructing data of the originating NE, and classifies this gathered data as data of the same path group (step 106).

When classification processing is completed, the NMS executes the above-described rearrangement processing group by group to arrange the items of path-information constructing data in the order of the path route (step 107). If rearrangement processing for all groups (all paths) is finished ("YES" at step 108), the NMS stores the resulting data arrangement in the database as path information (step 109) and terminates the processing for constructing path information.

(e) Detecting Path Change Caused by Erroneous Operation, and Recovery

Each NE is so adapted that path establishment and path alteration can be performed with ease from an external terminal such as a personal computer. Though the result is convenience, there are instances where an established path may be changed erroneously to a path having another construction. In such cases it is necessary to generate an alarm and restore the original path setting immediately.

Figure 8:
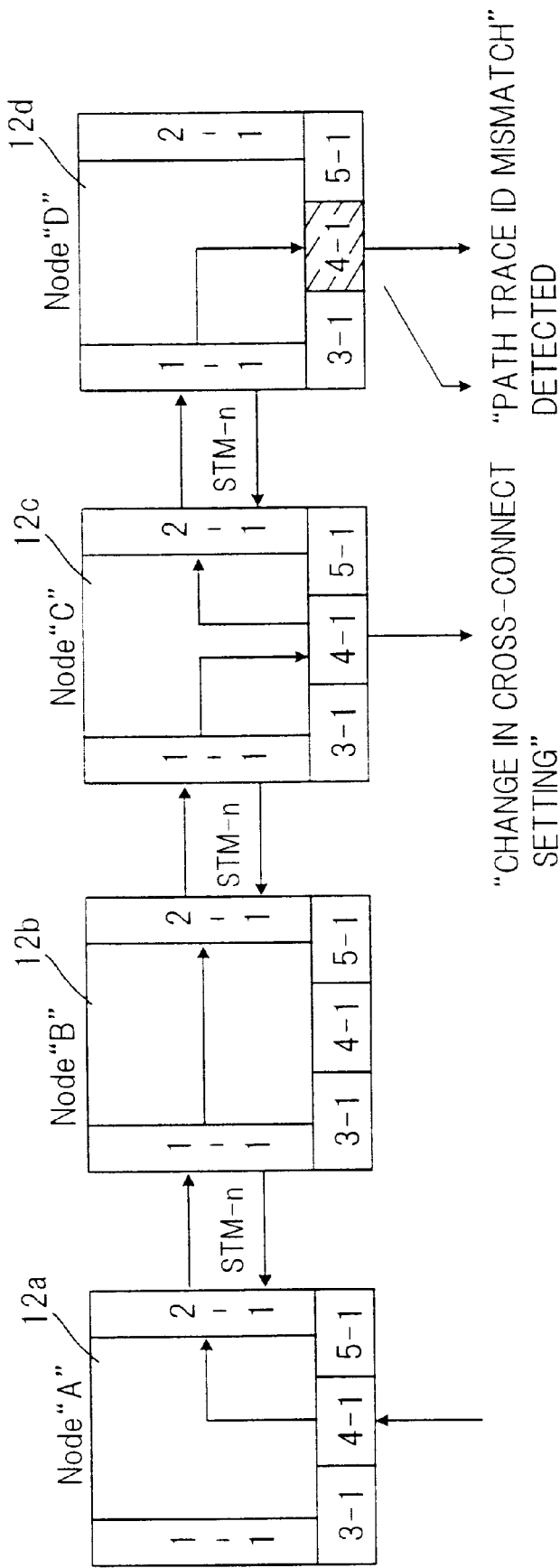
FIG. 8 is a diagram useful in describing a first path change detection method.

FIG. 8 is a diagram for describing a first method of detecting a change in path. Here it is assumed that the cross-connect of node C in FIG. 2 has been changed to facility (ID=1-1)→facility (ID=4-1) and facility (ID=4-1) →facility (ID=2-1), as shown in FIG. 8, starting from the original condition of the path setting illustrated in FIG. 2.

Before the cross-connect is changed, each of the nodes A through D periodically sends and receives the above-described path-trace transmission value. More specifically, the node A constituting the originating NE periodically transmits the path-trace transmission value "Node A, 4-1, Node A". If the nodes B through D receive the path-trace transmission value from upstream, then each changes the identifier of the source NE to its own identifier and sends the path-trace transmission value to the next node.

In parallel with this sending and receiving of the path-trace transmission value, each node performs path-change monitoring. That is, upon receiving the initial path-trace transmission value, each node retains the received path-trace transmission value as an expected value. Each node then compares path-trace transmission values received from the second time onward with the expected value. If a match is obtained, then the node construes that there was no path change (cross-connect change) upstream. If a mismatch is detected, however, the node judges that a cross-connect change has occurred at an upstream node and sends an alarm to the NMS.

Accordingly, when the cross-connect of node C is altered, as shown in FIG. 8, from the path setting shown in FIG. 2, the transmission value received subsequently at node D will differ from the expected value. As a result, the node D judges that a cross-connect was changed at an upstream node and sends a path-change alarm (Path Trace ID Mismatch Alarm) to the NMS. Upon receiving the path-change alarm, the NMS collects path-information constructing data from each node constructing the path indicated by the alarm, compares the cross-connect information contained in this path-information constructing data with the retained cross-connect information of the node and detects the node for which the cross-connect information does not match. In the case of FIG. 8, the cross-connect information of node C does not match. The NMS recognizes the change in cross-connect that took place at node C and instructs the node C to restore the original path. In other words, the NMS sends the original cross-connect information retained in the database to the node C so that the original cross-connect (path) is restored.

Figure 9:
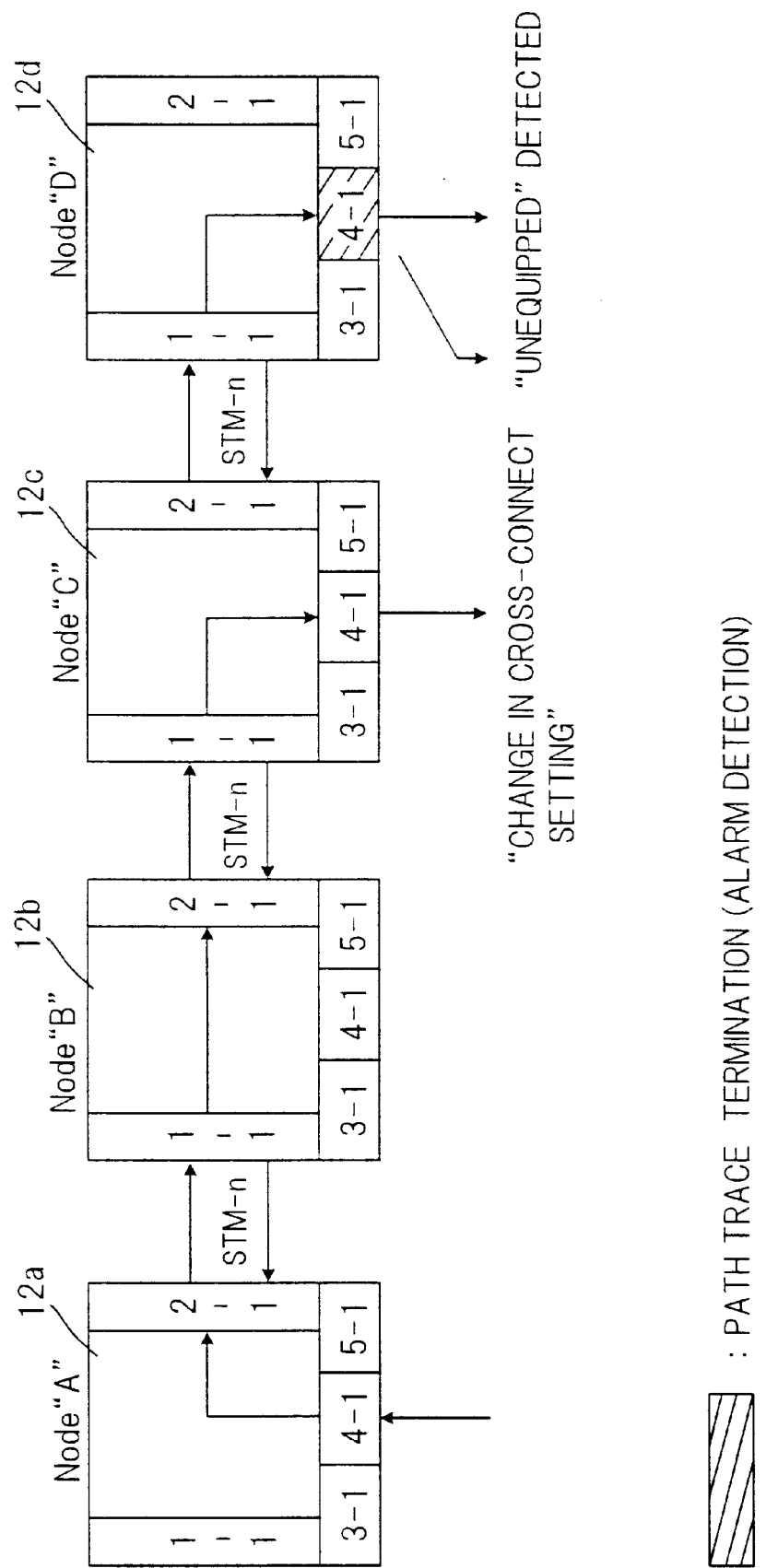
FIG. 9 is a diagram useful in describing a second path change detection method.

FIG. 9 is a diagram useful in describing a second path change detection method. Here it is assumed that the cross-connect of node C in FIG. 2 has been changed to facility (ID=1-1)→facility (ID=4-1), as shown in FIG. 9, starting from the original condition of the path setting illustrated in FIG. 2. When such a change in cross-connect is made, the node D cannot receive the expected path-trace transmission value even upon elapse of a predetermined period of time. In such case transmits a path-change alarm (Unequipped Alarm) to the NMS. Upon receiving this alarm, the NMS collects path-information constructing data from each node constructing the path indicated by the alarm, compares the cross-connect information contained in this path-information constructing data with the retained cross-connect information of the nodes and detects the node for which the cross-connect information does not match. In the case of FIG. 9, the cross-connect information of node C does not match. The NMS recognizes the change in cross-connect that took place at node C and instructs the node C to restore the original path. In other words, the NMS sends the original cross-connect information retained in the database to the node C so that the original cross-connect (path) is restored.

Figure 10:
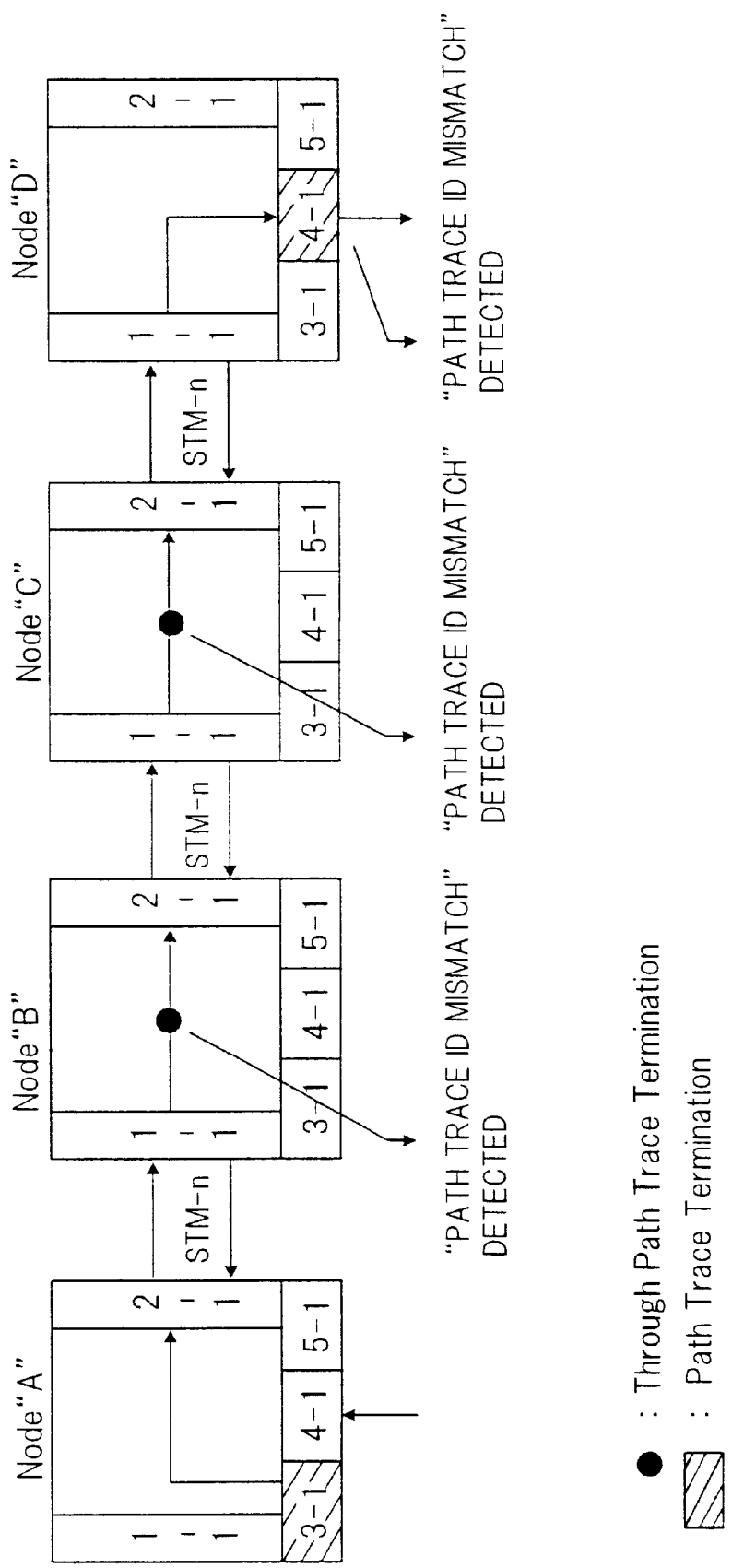
FIG. 10 is a diagram useful in describing a third path change detection method.

FIG. 10 is a diagram useful in describing a third path change detection method. Here it is assumed that the cross-connect of node A constituting the originating NE in FIG. 2 has been changed to facility (ID=3-1)→facility (ID=2-1), as shown in FIG. 9, starting from the original condition of the path setting illustrated in FIG. 2. When such a change in cross-connect is made, the subsequently received transmission value will differ from the expected value at all of the nodes with the exception of the originating node A, namely the nodes B through D. As a result, each of the nodes B through D sends a path-change alarm (Path Trace ID Mismatch Alarm) to the NMS. Upon receiving this alarm, the NMS checks to see whether the alarm has been detected from all of the nodes with the exception of the originating node of the path. If the alarm has not been detected from all nodes, then it is judged that a cross-connect change (path change) was made at a node other than the originating node and the above-mentioned cross-connect recovery processing is executed, as described in FIG. 8 or 9. If the change in the cross-connect shown in FIG. 10 is made, however, an alarm is detected from all nodes with the exception of the originating node.

Figure 11:
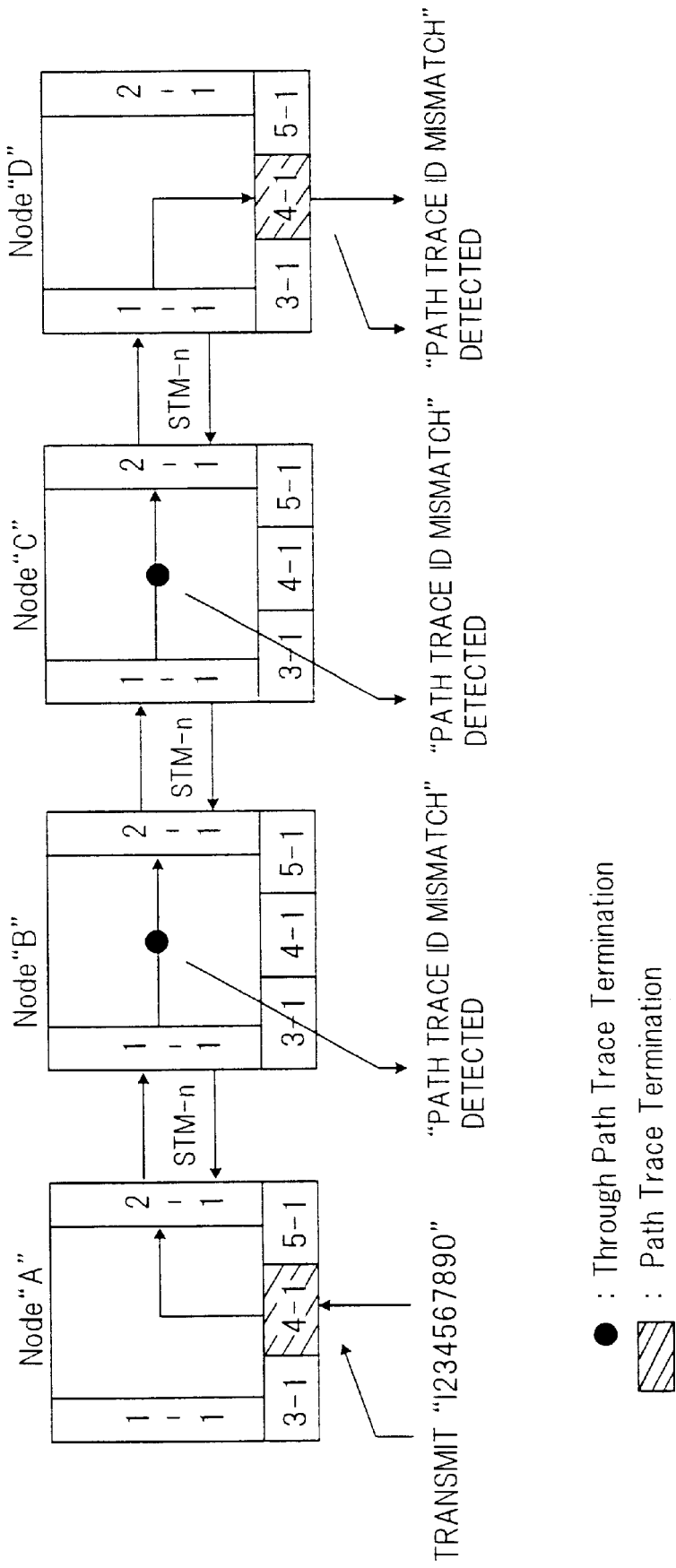
FIG. 11 is a diagram useful in describing a case where an originating node has changed a path-trace transmission value.

It should be noted that an alarm is detected from all nodes except for the originating node also in a case where the originating node A rewrites the path-trace transmission value, as illustrated in FIG. 11. No change in path (no change in cross-connect) is made in the case of FIG. 11. Accordingly, if a path-trace transmission value that has been rewritten is subsequently regarded as being an effective value and the expected value held by each node is changed, no problems arise.

In a case where the NMS detects an alarm from all nodes except for the originating node, therefore, the NMS deals with this by judging that a cross-connect was changed, as in FIG. 10, or that only a path-trace transmission value was changed, as in FIG. 11. In other words, in a case where an alarm is detected from all nodes with the exception of the originating node, the NMS determines whether the path-trace transmission value of the originating node matches the path-trace transmission value prevailing thus far. If the two match, the NMS judges that the cross-connect of the originating node was changed erroneously, as by erroneous operation of a local maintenance terminal or the like, and executes original-path restoration processing in regard to the originating node A, as illustrated in FIG. 10. In case of a mismatch, on the other hand, the NMS judges that the path-trace transmission value of the originating node was merely rewritten and that the path (cross-connect) was not changed, subsequently regards the rewritten path-trace transmission value as an effective value and ignores the alarm.

Figure 12:
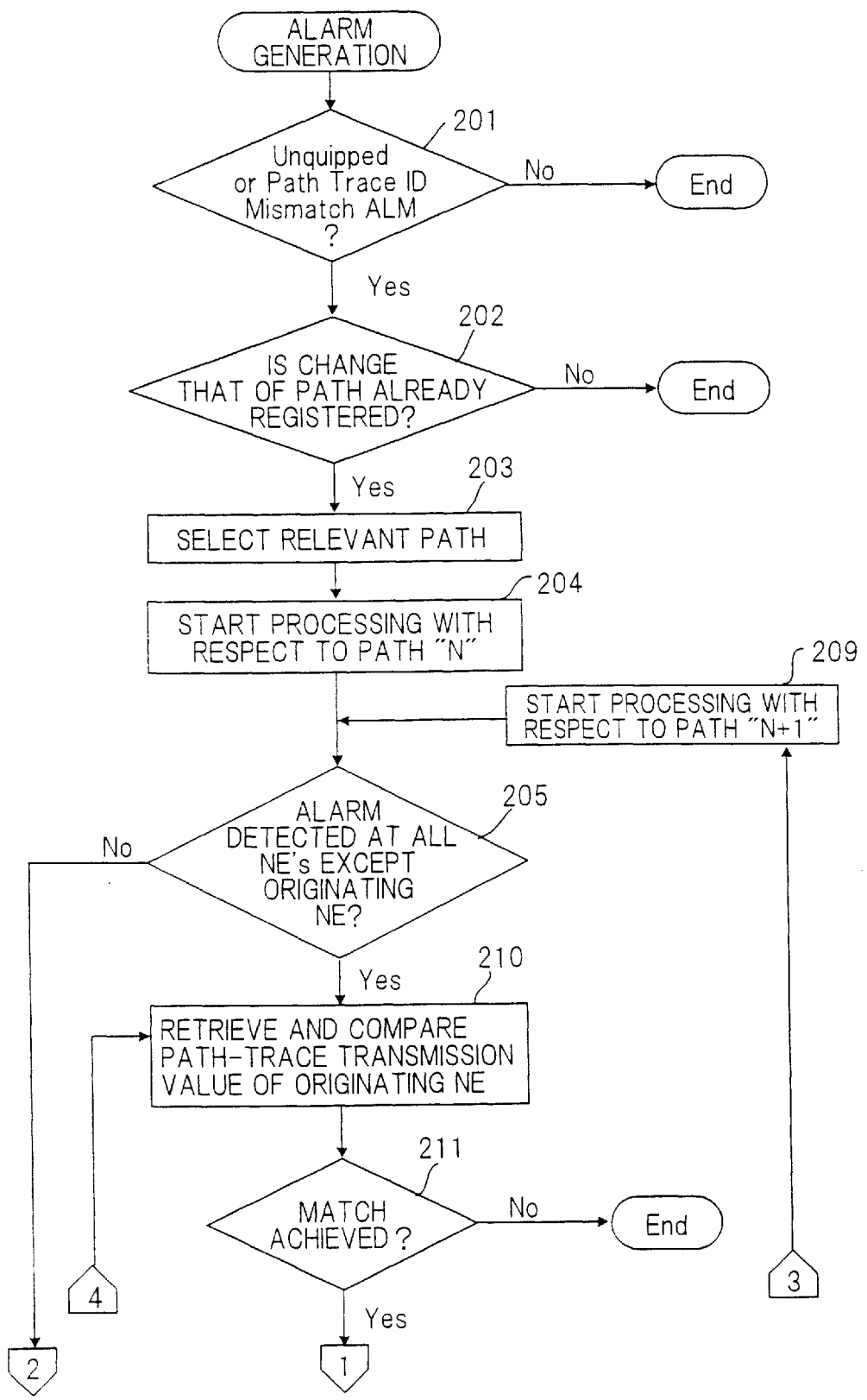
FIG. 12 is a flowchart (part 1) of processing for detecting a path change alarm and for performing a cross-connect recovery.
Figure 13:
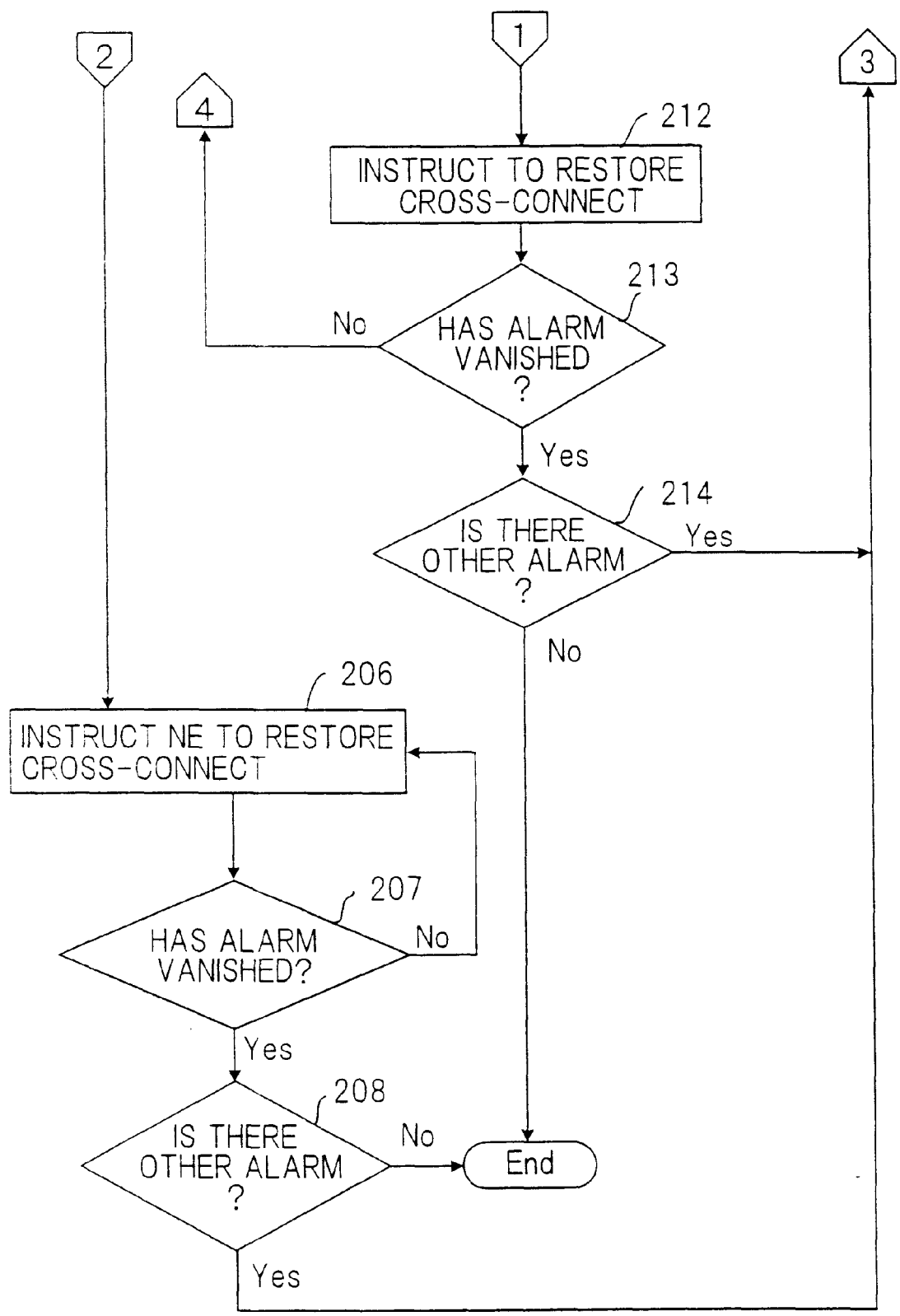
FIG. 13 is a flowchart (part 2) of processing for detecting a path change alarm and for performing a cross-connect recovery.

FIGS. 12 and 13 are flowcharts of processing for detecting a path change due to erroneous operation and for performing recovery.

If the NMS receives an alarm, the NMS proceeds to determine whether it is a path-change alarm (step 201). If the answer is "NO", then the NMS terminates path-change detection/recovery processing and executes other alarm processing.

If the received alarm is a path-change alarm, however, then the NMS determines whether the change is that of a path that has already been registered in the database (step 202). If the answer is "NO", the NMS terminates path-change detection/recovery processing and executes other alarm processing. If the change is to a path already registered, however, then the NMS selects the path (step 203). A changed path is not limited to a single path.

The NMS starts processing in regard to the prescribed path (step 204). First, the NMS determines whether a path-change alarm has been detected at all NEs with the exception of the originating NE (step 205). If the answer is "NO", the NMS judges that a cross-connect change (path change) was made at an NE other than the originating NE, collects path-information constructing data from each NE constructing the path of interest, compares the cross-connect information contained in this path-information constructing data with the retained cross-connect information of each node and detects the NE for which the cross-connect information does not match. If an NE for which the cross-connect information does not match is detected, then the NMS instructs this NE to restore the original path (step 206). The NMS then determines whether the alarm concerning the path of interest has vanished (step 207). If the answer is "NO", the NMS judges that a path change was made at another NE as well and repeats the processing from step 206 onward. On the other hand, if it is found at step 207 that the alarm of the path of interest has vanished, then the NMS check to see whether an alarm has been generated in another path (step 208). If such an alarm has not been generated, path-change detection/recovery processing is terminated. If an alarm has been generated in another path, however, then the NMS starts processing in regard to the other path (N+1) (step 209) and repeats the processing from step 205 onward.

If it is found at step 205 that the alarm has been generated at all NEs with the exception of the originating NE, then the NMS extracts the path-trace transmission value of the originating NE from the originating NE and determines whether this path-trace transmission value agrees with the original path-trace transmission value prevailing thus far (steps 210, 211). If the two do not agree, the NMS judges that the path-trace transmission value of the originating NE was merely rewritten and that the path (cross-connect) was not changed, subsequently regards the rewritten path-trace transmission value as an effective value and ignores the alarm.

On the other hand, if the path-trace transmission value does agree with the original path-trace transmission value prevailing thus far ("YES" at step 211), this means that the cross-connect of the originating node was changed erroneously, and therefore the NMS instructs the originating NE to restore the original path (step 212). The NMS then determines whether the alarm concerning the path of interest has vanished (step 213). If the answer is "NO", the NMS repeats the processing from step 210 onward. On the other hand, if the alarm of the path of interest has vanished, then the NMS checks to see whether an alarm has been generated in another path (step 214). If such an alarm has not been generated, path-change detection/recovery processing is terminated. If an alarm has been generated in another path, however, then the NMS starts processing in regard to the other path (N+1) (step 209) and repeats the processing from step 205 onward.

Though the present invention has been described in regard to a path established in a linearly configured network, the invention can be applied to any network.

In accordance with the present invention, path information can be constructed simply and in a short period of time by including a path-trace transmission value in path-information constructing data.

Further, in accordance with the present invention, path-information constructing data of an NE constructing a path can be selected in simple fashion by gathering path-information constructing data for which the originating NE identifiers as well as the originating facility identifiers, which are included in the path-trace transmission values, are identical.

Further, in accordance with the present invention, path-information constructing data of NEs constructing a path can be arranged in the order of the route of the path in simple fashion by using the path-trace transmission values.

In accordance with the present invention, the originating NE and each of the other NEs periodically send a path-trace transmission value in the direction of the destination NE. If each of these other NEs finds that the received transmission value differs from an expected value, or each of these other NEs cannot receive the transmission value upon elapse of a predetermined period of time, the node judges that the path has been changed erroneously and transmits an alarm to the NMS. In response to receiving the alarm, the NMS searches for the NE whose cross-connect has been changed and automatically subjects this NE to processing for restoration of the original path. Thus, by periodically transmitting a path-trace transmission value, a path change can be detected and dealt with immediately.

In accordance with the present invention, the originating NE and each of the other NEs periodically send a path-trace transmission value in the direction of the destination NE. If an alarm is detected from all of the NEs with the exception of the originating NE of the path, the NMS determines whether the path-trace transmission value of the originating NE agrees with the path-trace transmission value prevailing thus far. If the two match, the NMS judges that the cross-connect of the originating NE was changed erroneously, as by erroneous operation of a local maintenance terminal or the like, and executes original-path restoration processing automatically in regard to the originating NE. If the two do not match, the NMS judges that the path-trace transmission value of the originating node was merely rewritten and that the path was not changed, subsequently regards the rewritten path-trace transmission value as an effective value and ignores the alarm. Thus, by periodically transmitting a path-trace transmission value, a path change at the originating NE or a change in the path-trace transmission value can be detected and dealt with immediately.

As many apparently widely different embodiments of the present invention can be made without departing from the spirit and scope thereof, it is to be understood that the invention is not limited to the specific embodiments thereof except as defined in the appended claims.

What is claimed is:

1. A method of constructing a path in a network management system which collects data held by network elements constituting a network, uses this data to construct path information specifying a path which exists in the network, and manages the path information, said method comprising the steps of:

transmitting a path-trace transmission value from an originating network element, which is a starting point of a path, to the next network element in response to transition to a in-service state, said path-trace transmission value having:
   (1) an identifier of the originating network element;
   (2) an identifier of an originating facility; and
   (3) an identifier of a network element which transmits the path-trace transmission value;
   changing in a network element that has received this path-trace transmission value, the identifier of (3) above to its own identifier and transmitting the resulting path-trace transmission value to the next network element;
   similarly transmitting a path-trace transmission value from succeeding network elements up to a network element at an end point;
   holding in each network element, as path-information constructing data, cross-connect information for specifying an incoming-side facility and an outgoing-side facility of the network element and the path-trace transmission value that has been received;
   transmitting the path-information constructing data from each network element to the network management system in response to a request from the network management system; and
   constructing in the network management system, path information using the cross-connect information and the path-trace transmission value contained in path-information constructing data that has been collected.

2. The method according to claim 1, further comprising the steps of:
   causing the network management system to gather, from the path-information constructing data that has been collected, path-information constructing data for which the identifiers of the originating network elements are identical and, moreover, for which the identifiers of the originating facilities are identical; and
   causing the network management system to construct the path information using the path-information constructing data that has been gathered.

3. The method according to claim 2, wherein the network management system adopts a network element, which holds path-information constructing data having the identifier of the originating network element as the identifier of the network element in (3) above, as a first network element connected to the originating network element, adopts a network element, which holds path-information constructing data having the identifier of the first network element as the identifier of the network element in (3) above, as a second network element connected to the first network element, thenceforth performs a similar operation to obtain network elements along the route of the path, and constructs path information by arraying the path-information constructing data in the order of the network elements along the route of the path.

4. The method according to claim 1, further comprising the steps of:
   holding in each network element, an initially received path-trace transmission value as an expected value of a path-trace transmission value to be received subsequently;
   periodically sending from the originating network element and each of the other network elements, the path-trace transmission value in the direction of a destination network element respectively; and
   sending a path-change alarm from each of the network elements to the network management system if the received path-trace transmission value differs from the expected value or if a path-trace transmission value that matches the expected value is not received upon elapse of a predetermined period of time.

5. The method according to claim 4, further comprising the steps of:
   causing the network management system to collect cross-connect information from network elements constituting a path indicated by the path-change alarm;
   causing the network management system to compare this cross-connect information with the retained cross-connect information of these network elements, thereby obtaining the network element at which the path was changed; and
   causing the network management system to restore the original path in the network element at which the path was changed.

6. The method according to claim 4, further comprising the steps of:
   causing the network management system to determine whether the path-change alarm has been received from all network elements with the exception of the originating network element indicated by the path-change alarm;

if the path-change alarm has been received from all of the network elements with the exception of the originating network element, causing the network management system to compare the present path-trace transmission value of the originating network element with the retained path-trace transmission value; and if the compared path-trace transmission values match, causing the network management system to judge that the cross-connect information of the originating network element was changed and to restore the original path in this originating network element.

7. The method according to claim 6, further comprising a step of causing the network management system to judge that the path-trace transmission value of the originating network element was merely rewritten, and that there was no change in cross-connect, and to ignore the alarm if there is a mismatch between the present path-trace transmission value of the originating network element and the retained path-trace transmission value.

* * * * *